United States Patent [19]
Allinquant et al.

[11] 3,729,184
[45] Apr. 24, 1973

[54] SUSPENSION STRUT

[76] Inventors: Fernand Michel Allinquant; Jacques Gabriel Allinquant, both of 53 Avenue le Notre, Sceaux, France

[22] Filed: Jan. 25, 1971

[21] Appl. No.: 109,363

[30] Foreign Application Priority Data

Jan. 26, 1970 France..............................7002652
July 29, 1970 France..............................7028056

[52] U.S. Cl. ............................................267/64 R
[51] Int. Cl. ............................................F16f 5/00
[58] Field of Search.....................................267/64

[56] References Cited

UNITED STATES PATENTS 3,450,235  6/1969  Lohr.................................267/64
3,330,570  7/1967  Sherrill.............................267/64
3,491,993  1/1970  Scholin et al....................267/64

Primary Examiner—James B. Marbert
Attorney—William J. Daniel

[57] ABSTRACT

An oleopneumatic suspension strut provided with self-pumping means for automatic level-adjustment wherein said level adjustment is performed by means of a carrier piston incorporating a flap valve adapted to pump liquid out of a container into a suspension chamber through at least one port adapted to be uncovered by the piston and opening into a recess and through a system of gauged flap valves providing a passageway for the flow of liquid out of said recess into a tank storing liquid under pressure and out of the latter back into the container while the damping is ensured by a perforated partition separating the suspension chamber from pneumatic cushioning means.

7 Claims, 5 Drawing Figures

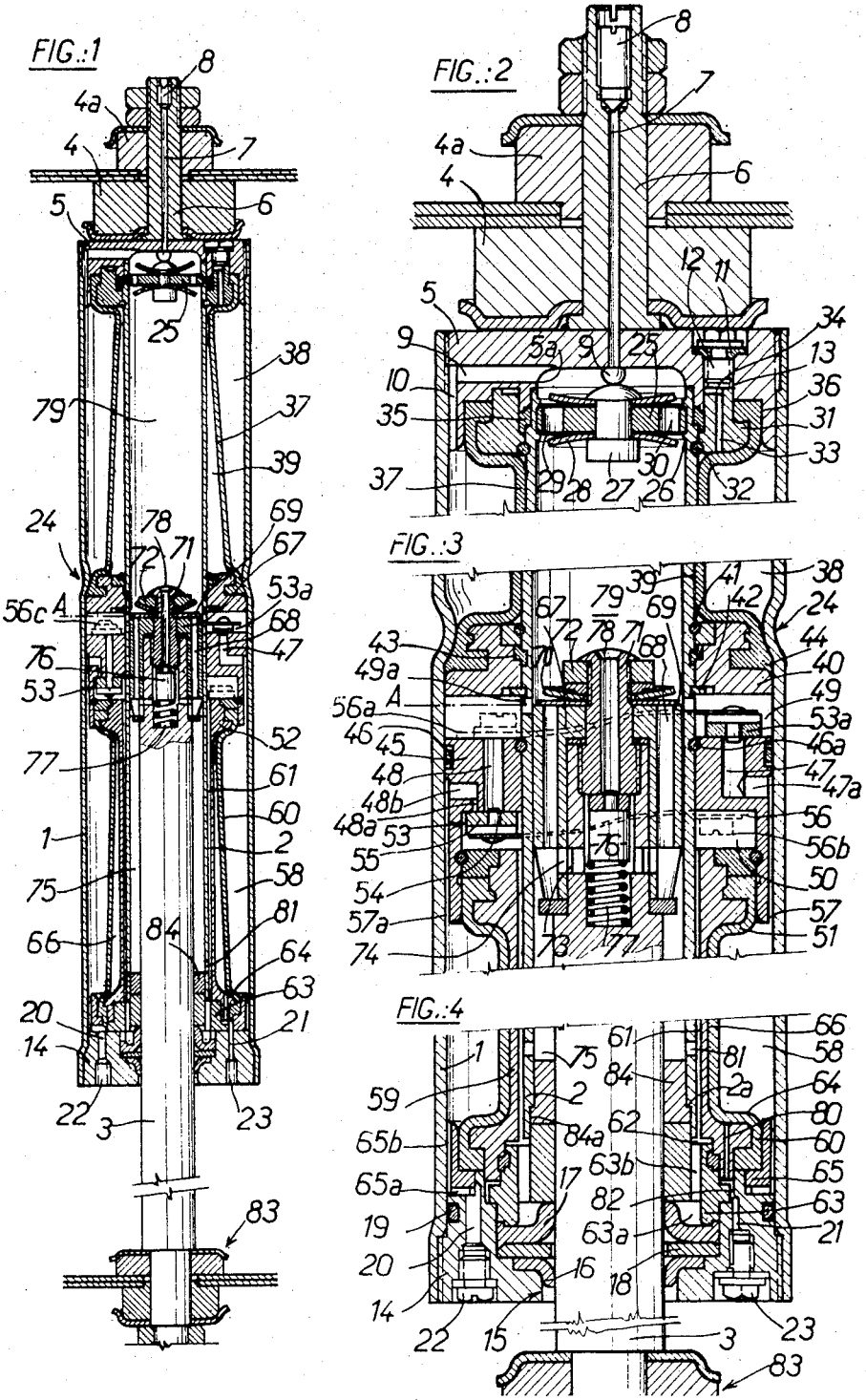

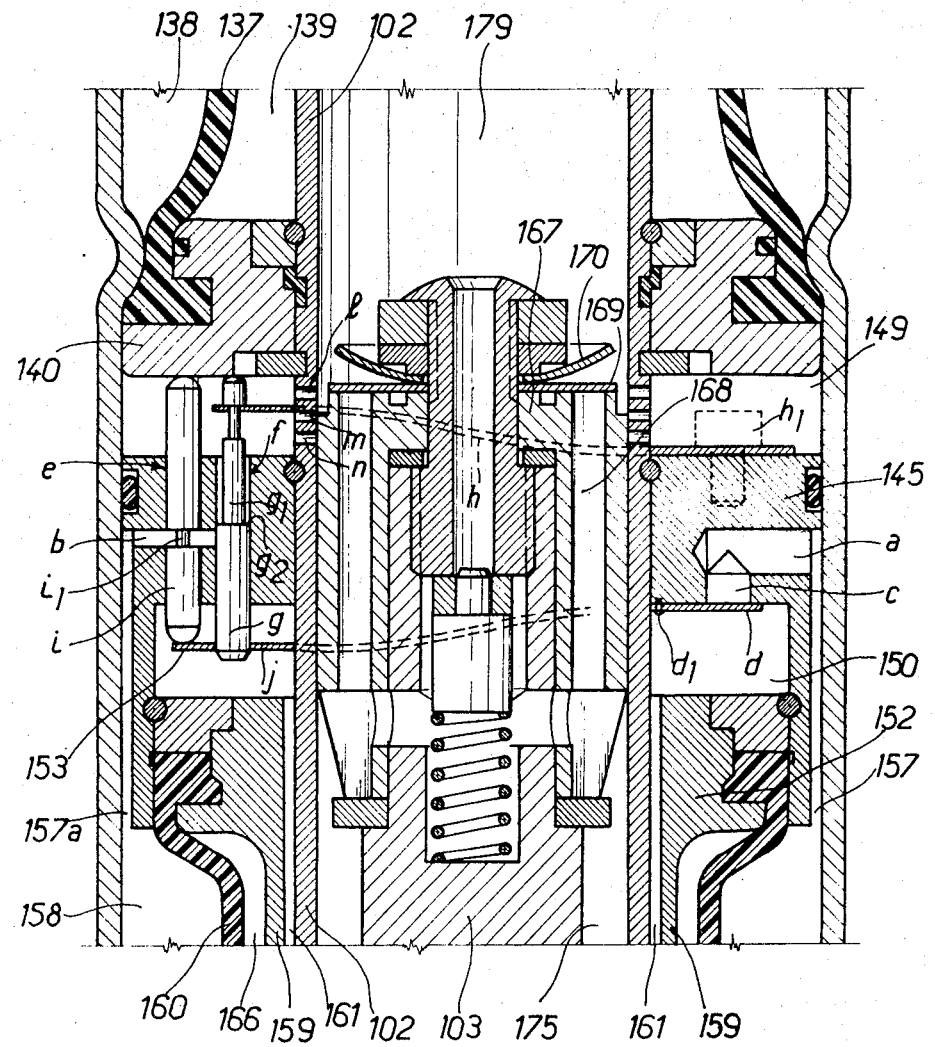

SUSPENSION STRUT

Our invention has for its object an oleopneumatic suspension strut the level in which is automatically adjusted through self-pumping, such a suspension strut being intended for use with engine-propelled vehicles.

It is a known fact that oleopneumatic shock absorbers have already been filled between the suspended and the non-suspended parts of an automobile so as to act both as shock-absorbers and as suspension struts carrying a fraction of the weight of the suspended parts, the remainder of the weight of which rests on springs, or else the entirety of said weight. The load on each shock-absorber is absorbed by an oleopneumatic suspension chamber the variable volume of which encloses a shock-absorbing fluid together with a compressed gas generally separated from said fluid by an elastic diaphragm. For instance, said chamber is rigidly secured to the vehicle chassis and its volume is defined by a piston rigid with an axle of the vehicle while means are provided for braking the shifting of the fluid produced by the movements of the piston so as to ensure the shock-absorbing action of the suspension thus designed. The compressed gas forms a fluid spring which provides elasticity for the suspension, generally in association with metal springs, and it is possible to adjust the level of the suspension, that is the height of the chassis above the axle by adding liquid or gas into the chamber or removing same.

Self-pumping oleopneumatic shock absorbers are known, wherein the level is adjusted by pumping means driven by the reciprocating piston and delivering liquid under pressure into the variable volume chamber; whenever the chassis is too high, the piston actuates a flap valve or uncovers a port so as to allow some fluid to be tapped off the variable volume chamber.

In all known self-pumping shock-absorbers, the flap valves provided for level adjustment are connected mechanically with the pumping means and cooperate in the shock-absorbing effect; consequently, the damping effect varies. Furthermore, the pumping means are intricate and include an auxiliary cylinder and piston system enclosing a pumping chamber provided with suction and delivery flap valves.

It has already been proposed to associate with a self-pumping shock absorber a collector of liquid under pressure constituted by a chamber enclosing liquid and compressed gas, generally separated by an elastic diaphragm. In all known embodiments, said collector is inserted in series between the pumping means and the variable volume chamber and the pumping means deliver into the collector the liquid, it sucks out of a container into which the liquid removed from the variable volume chamber is to be discharged. The flap valves referred to ensure in this case the adjustment of the level by providing a transfer of fluid out of the collector or storage tank into the variable volume chamber and out of the latter into the container. Furthermore, the pumping means deliver liquid into the storage tank as long as the pressure in the latter is not too high, after which its operation is idle. Such an arrangement produces therefore modifications in the damping rate and in the rigidity of the suspension.

Our invention covers a suspension strut of a simple structure, which shows none of the above drawbacks, while it may be readily incorporated with any vehicle provided with elastic suspension means such as blade springs or coiled wires or twist bars, or even devoid of any metal pring.

Our improved oleopneumatic suspension strut provided with automatic level adjusting means comprises, as in the case of the known self-pumping shock-absorbers provided with a storage tank referred to hereinabove, an aleopneumatic suspension chamber defined by a carrier piston, a further chamber forming a container for liquid under pressure, pumping means associated with the piston, automatic level-adjusting means adapted to deliver liquid into and to remove liquid out of the suspension chamber and shock-absorbing damping means.

Our improved suspension strut distinguishes chiefly from such known shock absorbers through the absence of any mechanical connection between the pumping means and the level-adjusting means and between the latter and the shock-absorbing damping means. Our improved suspension strut is in fact characterized by the fact that the pumping means deliver liquid sucked out of the container chamber into the oleopneumatic suspension chamber instead of into the storage tank while said pumping means are actuated uninterruptedly by the reciprocating piston and a number of gauged flap valves allows the storage tank to communicate with both said chambers so as to make up for the modifications in the volume occupied by the liquid in the system constituted by said chambers, the damping means being independent of the piston and of the pumping means and being housed inside the suspension chamber.

In a preferred embodiment, the damping means are constituted by a cylinder or tubular member inside which a piston carrying a piston rod may be reciprocate. The oleopneumatic suspension chamber is located with reference to the piston at the end opposed to the piston rod while the container is constituted by an annular chamber located at the other end of the piston, round the piston rod. The piston is provided with a non-return flap valve so as to actually form the pumping means and to allow furthermore the liquid to flow out of the annular chamber into the suspension chamber while the vehicle is being unloaded. One or more ports in that area of the wall of the tubular body, which registers with the adjusted level opens into an annular chamber surrounding the tubular body and connected with the system of gauged flap valves referred to hereinabove.

Through such an arrangement, the reciprocation of the carrier piston produces a permanent pumping action and the damping may retain an unvarying value whatever the level may be, that is both during periods of level adjustment and during periods of level stability.

An advantage of said preferred embodiment consists in that the damping means are of a single-tube structure which is thus of a simple and economical execution. The body of the tubular body is advantageously surrounded coaxially by an outer tube enclosing an annular space forming the storage tank for liquid under pressure and preferably also the section of the suspension chamber acting as fluid elastic means.

The chief feature of our improved suspension strut consists, as already mentioned, in that, in contradictinction with all known suspension struts, it shows no mechanical connection between the pumping means and the level adjusting means or between the latter and the damping means. Since the pumping means are incorporated with the carrier piston and the damping means are independent and may be adjusted separately as desired, there is no interference between the carrier part played by the piston and its damping part, said parts being played independently of each other. It is therefore possible to adjust the pressure of the gas in the suspension chamber and in the storage tank for the liquid under pressure in order to modify the carrying capacity of the piston without modifying the rate of damping.

In a modification of said preferred embodiment, the liquid may flow out of the storage tank while it raises a first spring-urged flap valve, towards a first recess into which the port or ports open at a predetermined level in the cylinder, that is they are distributed annularly round the axis of the cylinder in the case of a system of several parts. The liquid may also flow out of said first recess, while it raises a second spring-urged flap valve, into a second recess which communicates freely with the container. The second flap valve as it rises uncovers also a channel which communicates freely with the storage tank whereby the latter, the container and the compression chamber are interconnected.

This leads therefore to transfer fluid between the storage tank, the container and the suspension chamber at a rhythm which is accelerated when the piston reciprocates in an area of the cylinder inside which it covers and uncovers the ports in alternation. This results, inside the suspension chamber in sudden modifications in pressure which modifications, even if of a limited range, may nevertheless produce unpleasant jerks in the suspension.

In other embodiments, this slight drawback is avoided by further improvements. In the first place, the single port or row of ports is replaced by several ports or rows of ports distributed longitudinally of the cylinder in the area registering with the path of the piston when adjusting the level provided by the suspension. It is thus possible to subdivide the total cross-sectional area of the passage through which the liquid passes out of the suspension chamber so as to prevent the piston, when uncovering and covering suddenly the entirety of said passage, from producing pressure surges inside the suspension chamber.

According to a further embodiment, the first flap valve is replaced by a non-return flap valve through which the liquid may flow out of the storage battery into the container and the second flap is replaced by a system which allows the liquid to flow out of the suspension chamber into the storage tank and is constituted by a valve adapted to open whenever the difference between the pressures in the suspension chamber and in the container rises beyond a predetermined value, said valve being connected in series with a throughput regulator reducing the throughput of said flow of liquid gradually as the difference between said pressures increases. There is thus obtained a regulating action on the liquid flow whereby sudden modifications in pressure inside the suspension chamber are cut out.

The following description and accompanying drawings, given by way of example in a non-limiting manner, will allow our invention, its advantaves and its execution to be well understood. In said drawings:

FIG. 1 is a longitudinal sectional view of a suspension strut executed in accordance with a preferred embodiment of our invention, said suspension strut being shown in its operative condition.

FIGS. 2, 3 and 4 are larger-scale views of said suspension strut showing respectively the upper, medial, and lower sections of the strut in it deflated condition, that is when it carries no compressed gas.

FIG. 5 is a view similar to FIG. 3 showing an improved detail.

We will first briefly disclose the general structure of the suspension strut illustrated in FIGS. 1 to 4. Said strut forms an oleopneumatic shock-absorber provided with automatic self-pumping level-adjusting means and it comprises chiefly a liquid-filled cylinder 2 inside which a carrier piston 67 rigid with a piston rod 3 is adapted to move, said cylinder being associated with a storage tank 58, 60, 66 for liquid under pressure. The piston 67 separates within the cylinder 2 a first compartment 79 from a second compartment 75. The first compartment 79 communicates through the perforations in the damping wall 25, with a liquid-filled capacity 38 inside which the liquid is separated by a diaphragm 37 from a volume of gas 39 whereby said capacity forms an oleopneumatic suspension chamber. The second compartment 75 forms an annular chamber surrounding the piston rod 3 and plays the part of a container for a provision of liquid. Through the carrier piston 67, there extend channels 68, each provided with a non-return flap valve 69 whereby the movements of the piston inside the cylinder produce a pumping of the liquid out of the container 75 towards the suspension chamber 79–38. The level is adjusted through the agency of the ports 49a extending through the wall of the cylinder 2 and cooperating with the piston 67 with a view to controlling the opening and the closing of the connection between the inside of the cylinder 2 and a system of gauged flap valves 53–53a. The latter which are controlled by pressure ensure the transfer of liquid between the storage tank 58, the container 75 and the suspension chamber 79–38, so as to remove out of the latter the excess liquid which has been sucked in by the latter and to make up, through addition or substraction of the liquid in the storage tank 58, for the modifications in the volume occupied inside the cylinder 2 by the piston rod 3.

Turning to a more detailed inspection of FIG. 1 to 4, it is apparent that the damping means are constituted by two coaxial tubes 1 and 2. The upper end of the tube 1 is secured to the vehicle chassis with the interposition of elastic members 4 and 4a so as to allow any desired shifting, as required for the accurate operation of the damping means. Said elastic members 4, 4a are fitted over a pin 6 through which an axial bore 7 extends, which bore is closed by a needle valve 8. Said pin 6 is welded to an end-piece 5 provided with a blind bore 5a housing the upper end of the inner tube 2 forming the cylinder of the suspension strut. Said end-piece 5 is screwed inside and soft-welded to the upper end of the outer tube 1. In said end-piece there are also formed radial channels 9 opening into outer longitudinal grooves so as to provide a communication between the inside of the tube 2 and the annular space between the two tubes 1 and 2. A screw 12 screwed inside the end-piece 5 carries a fluidtight packing 11 so as to close a bore 13 provided with a valve which is not illustrated.

Within the lower end of the tube 1 there is screwed a plug 14 provided with a stepped axial bore inside which are fitted a flanged scraper 16 and a flanged fluidtight packing 17. This scraper and this packing are separated by a stay 18 urging them fluidtightly against the wall of the bore 15. The plug 14 carries a tore-shaped rubber packing 19 which produces fluidtightness along the inner surface of the tube 1. Said plug 14 is provided with two bores 20 and 21 closed by the corresponding screws 22 and 23 carrying fluidtight packings. The bore 21 is provided furthermore with a valve which is not illustrated. An annular recess 24 is formed in the medial portion of the tube 1.

The upper end of the bore in the tube 2 carries a partition or cover 25 which is held in position by notches 26 cut in the wall of the tube 2. A rivet 27 which extends through an opening formed centrally in the cover 25 locks the incurved washers over the opposite sides of the cover with the interposition of elastic prestressed discs 29 bearing against said washers and forming damping washers each of which closes in a conventional manner a series of channels 30 passing eccentrically through the cover 25.

Round the same upper end of the tube 2 there is fitted a ring 31 which is held in position by a wire or annulus 32 embedded for one half in the wall of the tube 2 and for the other half in said annulus 31. The latter is provided with a number of longitudinal bores 33 opening into a recess 34 communicating with the bore 13 in the end-piece 5.

The tube 2 is provided with a packing 35 held between the ring 31, the end-piece 5 and the outer wall of the tube 2, thereby to ensure fluidtightness between said three parts.

The upper flange 36 of a cylindrical diaphragm 37 is clamped between the end-piece 5 and a shoulder on the ring 31. The ring 31, the end-piece 5 and the flange 36 are shaped in a manner such that when assembled under pressure by a mere screwing of the plug 14 inside the tube 1, they obtain fluidtightness between the chambers defined by said parts, to wit the chamber 38, extending between the bore in the tube 1 and the diaphragm 37, and the chamber 39 extending between the outer wall of the tube 2 and said diaphragm 37 when in an expanded condition.

Round the central section of the tube 2, there is fitted an annular partition 40 held fast between two metal annuli 41 and 42. Fluidtightness is ensured between said partition and the tube 2 by a packing 43. The partition 40 is machined so as to form a recess housing the flange 44 at the lower end of the diaphragm 37. The location of the partition 40 on the tube 2 is such when the flange 44 is introduced into the tube 1 and urged upwardly by the mere screwing home of the plug 14, said flange is locked in position against the inner boss registering with the outer groove 24 in the tube 1, whereby fluidtightness is ensured between the tube 1 and the partition 40.

Round the central section of the tube 2, there is also fitted an annular valve box 45, the outer periphery of which mates accurately the inner surface of the tube 1, while a tore-shaped packing 46 provides fluidtightness. Said valve box 45 is held in position on the tube 2 by a metal annulus 46a engaging both the tube and the box. The annular valve box 45 is provided with two series of longitudinal cylindrical bores 47 and 48. The bores 48 extend through the valve box so as to interconnect a first annular chamber 49 extending between said box and the partition 40 with a second annular chamber 50 bounded by the enlarged upper end 52 of a tubular member 59 to be described hereinafter.

The first annular chamber 49 communicates with the inside of the tube 2 through ports 49a. As to the bores 47, they open at one end into the annular chamber 49 and at their other end into radial bores 47a leading to longitudinal grooves 57 opening into the chamber 58 to be described hereinafter.

Flap valves 53 and 53a are provided each with a metal head 54 to the underside of which is adhesively secured a gasket 55 made of a hard synthetic resin. Said flap valves are urged respectively against the ends of the bores 48 opening into the chamber 50 and against the ends of the bores 47 opening into the chamber 49 by corresponding arcuate spring blades 56 and 56a secured to the valve box 45 by screws 56b and 56c. Furthermore, the flap valves 53 close auxiliary bores 48a connected through radial bores 48b with longitudinal grooves 57a opening as in the case of the grooves 57 into the chamber 58. Thus when the flap valves 53 rise off their seats, they uncover both the bores 48 and the bores 48a whereby the chamber communicates both with the chamber 50 and with the chamber 58.

The tubular member 59 referred to hereinabove surrounds coaxially the lower end of the tube 2 while its upper enlarged end 52 engages and holds fast the upper flange 51 of an elastic deformable diaphragm 60. The annular space 61 extending between the outer surface of the inner tube 2 and the surface of the bore in the member 59 opens at one end into the chamber 50 and at its other end into an annular groove 62 cut in the upper end of a ring 63. The latter rests on the flanged packing 17 and its lower surface shows a recess 63a communicating with the groove 62 through the longitudinal bores 63b.

The lower end of the diaphragm forms a flange 64 through which the diaphragm is rigidly held between a shoulder at the lower end of the tubular member 59 resting on the ring 63 urged upwardly by the plug 14, and an annular bolt 65. Said lower diaphragm 60 separates two chambers of which the above-mentioned chamber 58 extends between the inner surface of the tube 1 and the outer surface of the diaphragm while the other chamber 66 extends between the inner surface of the diaphragm and the tubular member 59 when the diaphragm 60 is in expanded condition.

The annular bolt 65 rests on the plug 14 and its lower surface is provided with an annular recess 65a communicating with a bore 20 and with longitudinal grooves 65b formed at the periphery of the bolt 65 and opening into the chamber 58.

The axial piston rod 3 slidingly extending through the packings 16 and 17 is guided by the ring 63 centrally fitted with reference to the plug 14. The piston 67 at the upper end of the rod 3 is adapted to slide inside the cylinder 2 and separates in the latter the annular chamber 75 surrounding the piston rod from the upper chamber 79. Longitudinal eccentric channels 68 extending through the piston are closed by an elastic disc 69 acting as a non-return flap valve the rise of which is limited by a cup-shaped washer 70.

The flap valve 69, the washer 70 and the piston 67 are held together by a pin 71 screwed into the rod 3 and extending axially through the piston 67 while a nut 72 screwed over the upper end of the pin 71 is held in position by a riveting of the head of the pin over the nut. The pin 71 is provided with a bore 78 opening into a chamber 73 formed inside the piston rod. Said chamber 73 communicates through channels 74 with the annular chamber 75 separating the rod 3 from the tube 2. Said chamber 75 communicates in its turn with the annular space 61 within the tubular member 59 through ports 81 provided at the lower end of the tube 2. A valve 76 held in position by a spring 77 closes normally the bore 78 in the pin 71.

It should be remarked that the diameter of the flange 36 on the diaphragm 37, fitted over the ring 31, is smaller than the inner diameter of the boss formed by the groove 24 in the outer tube 1, so that the shock-absorbing system may be positioned by an upward shifting, within the tube 1 previously provided with its end-piece 5, of the tube 2 carrying all its inner and outer auxiliaries, following which the plug 14 is screwed into the tube 1.

The chambers 75, 79, 38, 58, 49 and 50 are filled with a suitable hydraulic liquid. The filling is performed through the bore 20 after the screw 22 has been removed and the needle valve 8 acting as a draining screw has been released so as to allow the entrapped air to escape. When the liquid has reached and filled the channel 7, the screws 8 and 22 are tightened so as to ensure a fluidtight closure. The chamber 39 is filled with a compressed gas through a connection engaging the bore 13 provided with a valve, not illustrated, as already mentioned, after the screw 12 has been removed, the compressed air passing through the recess 34 and the ports 33. The chamber 66 is similarly filled with a compressed gas, after removal of the screw 23, through the bore 21 in the plug 14 under control of the valve, not illustrated, within said bore, the gas flowing beyond said bore through a channel 80 extending through the flange at the lower end of the tubular member 59, after passing through the recess 82 between the ring 63, the plug 64 and the tubular member 59.

The piston rod 3 is secured at 83 to an axle of a vehicle with the interposition of elastic parts similar to those illustrated at 4 and 4a.

The shock absorber thus executed, filled and assembled comprises consequently the following operative sections:

an oleopneumatic suspension chamber rigid with the vehicle chassis and constituted by the liquid-filled chambers 79 and 38 and by the chamber 39 filled with compressed gas and located within the diaphragm 37;

a liquid container constituted by the annular chamber 75;

a carrier system rigid with the vehicle axle and constituted by the piston rod 3 and the piston 67 which separates the container 75 from the suspension chamber;

shock-absorbing means which are independent of the piston and include the flap valves 29 braking the flow of liquid through the channels 30 in the partition 25 closing the suspension chamber;

the non-return flap valve controlling the flow of liquid out of the container 75 into the suspension chamber through the channels 68 in the piston whereby the latter is adapted to pump liquid out of said container into said chamber;

a storage tank for liquid under pressure constituted by the chambers 58 and 66 containing respectively liquid and gas under pressure and separated by the lower diaphragm 60;

automatic level-adjusting means adapted to transfer liquid between the suspension chamber, the storage tank and the container, said means including the gauged flap valves 53 and 53a, and the ports 49a cooperating with the piston.

When the vehicle is moving, the oscillations of the suspension cause the piston 67 to reciprocate. When the piston is positioned above the level A of the ports 49a, it pumps liquid out of the annular chamber or container 75 into the suspension chamber, since the flap valve 69 opens during the downward movements of the piston and closes during its upward movements. The elastic reaction exerted by the gas enclosed in the chamber 39 urges the piston back through the agency of the diaphragm 37 and of the liquid filling the chambers 38 and 79. The piston 67 sinks therefore down to the level A whereby it uncovers the ports 49a which allow the liquid to pass out of the suspension chamber into the annular chamber 49 and to raise the flap valves 53 against the action of the spring 56 whereby the suspension chamber becomes connected with the annular container chamber 75 through the annular gap 61 and the ports 81 and with the storage tank chamber 58 through the bores 48a, the radial bores 48b and the grooves 57a. This forms a by-pass for the pumping action of the piston 67.

It should be remarked that when the piston sinks thus towards the level A, the available volume within the tube 2, constituted by the two chambers 75 and 79 increases by reason of the reduction in the length of the part of the piston rod within the tube 2. This increase in the available volume is compensated by the liquid passing out of the storage tank chamber 58 into the annular container chamber 75 through the grooves 57, the bores 47a and 47, the flap valves 53a, the annular chamber 49 and the ports 49a.

When the piston 67 has sunk underneath the level A, the reciprocatory movements of the piston 67 and of its rod 3 produce similarly modifications in the volume of the annular container chamber 75. These modifications in volume are compensated by transfers of liquid.

on the one hand between the annular chamber 75 towards the suspension chamber 79 through the bores 68 in the piston and the corresponding flap valve 69;

on the other hand, from the suspension chamber through the ports 49a, the annular chamber 49 and the flap valves 53 towards the annular chamber 75 and the storage tank chamber 58.

This latter transfer provides for the permanent and complete filling of the volume available within the annular chamber 75 and, since the surplus liquid passing out of the suspension chamber is taken up by the storage tank, the pressure sinks within the suspension chamber, which leads to a reduction in the force exerted by it on the carrier piston which returns therefore to the level A.

In both operative conditions as described hereinabove, a moment is reached at which the piston enters a position for which it closes the ports 49a. When the piston oscillates within such an area, fluid flows out of the outer storage tank container 58 towards the annular container chamber 75 through the chambers 50 and 49 and the flap valves 53a and 53, and out of said annular chamber 75 towards the suspension chamber through the bores 68 in the piston and the flap valve 69. This increases the pressure in the suspension chamber until the piston uncovers again the ports 49a.

It should be remarked that the operation of the damping means produces pulsatory transfers of liquid between the storage tank and the two chambers 75 and 79 through the flap valves 53 and 53a in the flap valve box 45, the ports 49a and the flap valve 69 on the piston 67. This allows the storage tank to play its part as means for carrying a provision of liquid in order to make up for the modifications in the volume occupied by the liquid in the associated chambers 75–79. Furthermore, the periodical opening of the flap valve 53 ensures a corresponding communication between the suspension chamber, the annular container chamber 75 and the storage tank chamber 58 whereby a balance in average pressure is obtained between the three chambers.

The damping of the suspension strut is ensured in a conventional manner by the flap valves 29 in the covering partition 25. Under the action of the shocks applied to the rod 3 of the piston 67, the liquid carried inside the upper cylinder chamber 79 has a tendency to flow out towards the chamber 38 through the passageways 30, 9 and 10 and thus compresses the gas carried inside the chamber 39; the elastic reaction of said gas has however a tendency to return the liquid into the chamber 79 and thereby urges back the piston towards its original position. As it passes through the bores 50 in the covering partition 25, the liquid raises intermittently the flap valves 29 and the losses in load thus arising damp, as well-known in the art the oscillations of the piston 67 and of its rod 3. Such losses in load lead to a dissipation of energy and therefore to a heating of the liquid; however the transfer of the latter into the chamber 38 sets it in contact with the wall of the tube 1 whereby the cooling is performed under optimum conditions by the surrounding masses of air.

In the case of a very harsh compressional shock, the resistance afforded by the flow of liquid through the passageways 30 and the flap valves 29 in the partition 25 may lead to a dangerous overpressure inside the chamber 79. In order to cut out such a dangerous result, a predetermined over pressure in said chamber 79 is adapted to open the safety valve 76 against the pressure of the spring 77, whereby the liquid escapes through the ports 74 into the chamber 75 so that the overpressure in the chamber 79 cannot rise above said predetermined value.

An elastic ring 84, surrounding the piston rod 3 and showing at its lower end a shoulder 84a is urged against a cooperating shoulder 2a of the cylinder tube 2 by the ring 63 and serves as an elastic abutment cutting out any metal against metal contact between the piston and the ring 63 forming the bottom of the cylinder tube 2.

Although the damping means have been illustrated and described as including the chamber 79 at its upper end with the piston rod 3 directed downwardly, it would obviously operate as well in any other position and in particular in a reversed position. Furthermore it is possible to reverse the arrangement of the oleopneumatic chambers 38–39 and/or 58–66. In other words, the gas-filled chamber or chambers may be located in contact with the outer tube 1 and the liquid-filled chamber or chambers in contact with the inner tube 2.

We will now describe the modifications shown in FIG. 5.

The general structure of the suspension strut illustrated partly in FIG. 5 is similar to that of the strut described with reference to FIG. 1 to 4 and its components playing the same part carry the same reference numbers increased by 100. The carrier piston 167 secured to the piston rod 103 is provided with eccentric longitudinal bores enclosing non-return valves 169 and it slides within the cylinder 102 wherein it separates the compartment 179 forming part of the oleopneumatic suspension chamber from the compartment 175 forming an annular liquid-containing chamber. The chamber 158 of the collector storing liquid under pressure is separated from the gas-filled chamber 166 by an elastic sleeve or diaphragm 160. The liquid-filled chamber 138 is similarly separated from the cooperating gas-filled chamber 139 by the elastic sleeve or diaphragm 137 and it communicates with the compartment 179 to form therewith the oleopneumatic system, the communication being provided by a perforated covering partition carrying damping flap valves, not illustrated, as disclosed with reference to FIG. 2.

The annular partition 140 and the expanded upper end 152 of the tubular member 159 enclose between them and the corresponding upper and lower ends of the valve box 145, annular recesses shown respectively at 140 and 150, the recess 150 communicating with the annular container 175 through the annular clearance 161 and a port, non illustrated, in the wall of the cylinder 102 near its lower end.

The valve box 145 is an annular part provided with radial inwardly directed spaced blind bores $a$, and $b$ opening outwardly into the storage tank 158 through the corresponding longitudinal grooves 157 and 157a. The radial bore $a$ communicates with a further blind bore $c$ extending longitudinally within the valve box 145 and opening into the recess 150 under control of a non-return valve $d$ constituted by a copper foil secured to the valve box at $d_1$. Said foil shows a reduced rigidity so that said non-return valve opens as soon as the pressure in the container 175 drops underneath the pressure inside the storage tank chamber 158 so as to allow liquid to flow out of the latter into said container 175.

The radial bore $b$ extends across a first bore $e$ formed longitudinally in the valve box and connecting the two recesses 149 and 150 and the inner end of the radial bore $e$ opens into a second bore $f$ which is parallel with the above mentioned bore $e$. Inside said second longitudinal bore, a small bar $g$ may slide the cross-section of which matches that of the bore $f$, said small bar including an extension $g_1$ of a smaller diameter, one of which engages normally the annular partition 140 under the action of an arcuate blade spring $h$ housed within the annular recess 149 and secured to the valve box 145 by a screw $h_1$. The extension $g_1$ merges into the actual bar $g$ along a shoulder $g_2$ which, in the position illustrated lies higher than the bore $b$, so that the bar $g$ cuts off the connection between the latter and the longutudinal bore $f$.

In the first longitudinal bore $e$, a further small bar $i$ may slide, which is urged upwardly so that its upper end may engage normally the annular partition 140, by a further arcuate blade spring $j$ housed within the recess 150 and secured to the valve box 145 by a screw, not illustrated, similar to the screw $h_1$. The small bar $i$ is provided with a section of a reduced diameter $i_1$ the height of which is equal to the diameter of the radial bore $b$ and which registers with the latter when the upper end of the bar $i$ engages the partition 140.

Each small bar $g$ and $i$ is obviously subjected on its opposite ends to the pressures prevailing in the recesses 149 and 150 respectively.

Three small superposed ports $l$, $m$, $n$, extending through the wall of the cylinder 102 open into the annular recess 149.

As disclosed with reference to FIG. 1 to 4, the operation of the suspension strut requires on the one hand the liquid to be urged out of the chamber 179 and, on the other hand, an exchange of liquid to be performed between the storage tank chamber 158 and the inside of the cylinder 102, so as to make up for the modifications in the volume occupied inside the latter by the piston rod. Said removal of liquid out of the chamber 179 and said exchange of liquid are ensured in the present case by a circulation of liquid inside a closed circuit. The reciprocation of the piston inside the cylinder 102 pumps liquid out of the annular container 175 towards the upper chamber 179 forming part of the oleopneumatic suspension chamber.

The recess 150 communicates with the container 175 and is therefore normally subjected to the same pressure as the latter. When said pressure drops underneath that prevailing in the storage tank chamber 158, the non-return flap valve $d$ opens and allows liquid to flow out of the chamber 158 into the container 175 through the grooves 157, the bores $a$ and $c$, the recess 150, the groove or clearance 161 and the port, not illustrated in the cylinder 102.

The pumping action increases the pressure in the upper chamber 179 and causes therefore the piston 167 to sink. When the latter moves in registry with the area provided with the ports $l$, $m$, $n$, it uncovers said ports in succession, so that the recess 149 is subjected to the same pressure as the upper chamber 179. As soon as the force exerted on the bar $g$ by the difference in pressure between recesses 149 and 150 rises and overcomes the pressure exerted by the spring $h$, the bar $g$ sinks and its shoulder $g_2$ uncovers the connection between the bores $f$ and $b$. Consequently the liquid flows out of the chamber 179 into the recess 149 through the port $l$ and subsequently through the ports $m$ and $n$ when uncovered by the piston; from the recess 149, the liquid flows through the clearance in the bore $f$ round the extension $g_1$ and through the radial bore $b$ to either side of the reduced diameter part $i_1$ of the bar $i$, the liquid passing finally out of $b$ into the storage tank chamber 158, through the longitudinal grooves 157$a$. However, if the force exerted on the bar $i$ by said difference in pressure rises further and overcomes the pressure exerted by the spring $j$, the bar $i$ sinks so that its reduced diameter part $i_1$ is shifted away from the bore $b$ and throttles the cross-section of the passage afforded by the latter, this throttling increasing with the difference in pressure. The recess 150 communicates freely with the container chamber 175 through the clearance provided by the longitudinal grooves 161. This results in that if the port $l$ and possibly the ports $m$ and $n$ are uncovered by the piston and if the difference in pressure between the chambers 179 and 175 to either side of the piston rises above a predetermined value, fluid passes out of the chamber 179 into the storage chamber 158 at a rate which decreases when the difference in pressure increases.

The bar $g$ forms thus a gauged valve inserted in series with the throughput-adjusting means constituted by the bar $i$, thereby to discharge liquid out of the oleopneumatic suspension chamber as soon as the overpressure in the latter with reference to the pressure in the container is high enough for the piston to uncover at least one of the ports $l$, $m$, $n$ and rises above a predetermined value, the throughput decreasing thus when the overpressure increases. This cuts out the necessity of removing suddenly a large amount of liquid out of the oleopneumatic suspension chamber, which would otherwise be the case if a pressure surge were to arise in the suspension chamber.

Furthermore, the stepped arrangement of the ports $l$, $m$, $n$ allows the piston to reciprocate within the corresponding longitudinal area of the cylinder without any sudden complete opening and closing of the connection between the oleopneumatic suspension chamber and the exhaust means 149-$f$-$b$-157$a$ which would also lead to the production of pressure surges.

The liquid is exhausted thus out of the oleopneumatic suspension chamber in accordance with pulses corresponding to a succession of thresholds so as to cut out the production of shocks produced by very speedy modification in pressure inside said chamber. It will be appreciated that the energy stored in the springs $h$ and $j$ and their preliminary stressing as also the size of the ports $l$, $m$, $n$ and their spacing should be selected in a manner such that such thresholds provide a highly comfortable suspension.

Obviously, other embodiments may be contemplated and the valve $g$ may be replaced by a valve controlled by a differential piston and subjected possibly to a spring pressure. The adjusting means $i$ may also be constituted by a differential piston. One at least of the ports $l$, $m$, $n$ may again be replaced by an annular row of ports along the inner periphery of the cylinder 102.

What we claim is:

1. An oleopneumatic suspension strut comprising a liquid-filled tubular body forming a shock-absorber cylinder, a carrier piston including a piston rod adapted to reciprocate in said cylinder and separating the latter into a first compartment forming part of a suspension chamber and a second compartment forming an annular liquid-containing chamber surrounding the piston rod, a partition defining within the suspension chamber a cushioning section carrying liquid subjected to the pressure of a gas, said partition being provided with passageways adapted to the flow of liquid between said cushioning section and the remainder of the suspension chamber, a non-return valve system in the piston controlling the flow of liquid from the annular liquid-containing chamber into the suspension chamber, means storing liquid under pressure and constituted by a chamber containing liquid and a gas, and level-adjusting means including a recessed part, port means opening into the recess in said part and extending through the peripheral wall of the tubular body at a point intermediate along the same, and a system of spring loaded valves controlling the passage of liquid out of the recess into the liquid-storing chamber and out of the latter into the annular liquid-containing chamber.

2. A suspension strut as claimed in claim 1 comprising an outer tube surrounding the tubular body and defining with the latter an annular space the terminal portions of which form respectively the liquid-storing chamber and the cushioning section of the suspension chamber, an annular valve box carried within said annular space between said liquid-storing chamber and said cushioning section, said box forming on one side the recessed part and being provided on its opposite side with a hollow communicating with the annular liquid-containing chamber, said valve box being provided furthermore with a first and a second bore and with an auxiliary bore providing respectively passageways for the liquid between the liquid-storing chamber and the recess, between the recess and the hollow in the valve box and between the hollow and the liquid-storing chamber and two gauged valves controlling respectively the first bore in the valve box and the two last-mentioned bores therein.

3. A suspension strut as claimed in claim 1 wherein the port means include at least two ports spaced longitudinally with reference to each other in the wall of the tubular body.

4. A suspension strut as claimed in claim 1 wherein the spring loaded valve system includes a non-return flap valve controlling the flow of liquid out of the liquid-storing chamber towards the liquid-containing chamber and an arrangement controlling the flow of liquid out of the suspension chamber towards the liquid-storing chamber and constituted by a valve adapted to open under the action of a difference in pressure between the suspension chamber and the liquid-containing chamber which is higher than a predetermined value and by throughput-throttling means inserted in series with last-mentioned valve to reduce said flow when said difference in pressure rises.

5. A suspension strut as claimed in claim 1 comprising a valve box enclosing the spring loaded valve system and incorporating the recessed part on one side and provided on the other side with a hollow connected with the liquid-containing chamber and provided furthermore with ducts connecting the recess and the hollow with the liquid-storing chamber and with a channel freely connecting said hollow with the liquid-containing chamber, said spring loaded valve system including a non-return valve controlling the flow of liquid out of the liquid-storing chamber towards the liquid-containing chamber and inserted in the duct connecting the hollow with the liquid-storing duct at the end opening into said hollow, and an arrangement constituted by a valve inserted in the duct leading to the recess and adapted to open whenever the difference in pressure between the suspension chamber and the liquid-containing-chamber rises above a predetermined value and by throughput-throttling means inserted in last-mentioned duct beyond said valve to reduce the flow of liquid when said difference in pressure rises.

6. A suspension strut as claimed in claim 1 comprising a valve box enclosing the spring loaded valve system and incorporating the recessed part on one side and provided on the other side with a hollow connected with the liquid-containing chamber and provided furthermore with ducts connecting the recess and the hollow with the liquid-storing chamber and with parallel bores connecting the recess with the hollow and extending across successive points of the duct connecting the recess with the liquid-storing chamber, the box being also provided with a channel freely connecting said hollow with the liquid-containing chamber, said spring loaded valve system including a non-return valve controlling the flow of liquid out of the liquid-storing chamber towards the liquid-containing chamber and inserted in the duct connecting the hollow with the liquid-storing duct at its end opening into said hollow, and an arrangement constituted by a bar-shaped valve inserted slidingly in one of the bores in the box; adapted to open the duct associated with said bores whenever the difference in pressure between the hollow and the recess rises beyond a predetermined value and by a throttling bar inserted slidingly in the other bore to reduce the flow of liquid when said difference in pressure rises.

7. A suspension strut as claimed in claim 4 wherein the port means include at least two ports spaced along the wall of the tubular body in an axial direction.

* * * * *